(12) United States Patent
Li et al.

(10) Patent No.: US 6,903,889 B2
(45) Date of Patent: Jun. 7, 2005

(54) METHOD AND APPARATUS FOR TUNING A MAGNETORESISTIVE BIAS PARAMETER IN A DATA STORAGE SYSTEM

(75) Inventors: Liu Li, Singapore (SG); Quek Leong Choo, Singapore (SG); Song Wee Teo, Singapore (SG); Myint Ngwe, Singapore (SG); Beng Wee Quak, Singapore (SG)

(73) Assignee: Seagate Technology, Scotts Valley, CA (US)

( * ) Notice: Subject to any disclaimer, the term of this patent is extended or adjusted under 35 U.S.C. 154(b) by 107 days.

(21) Appl. No.: 10/461,558

(22) Filed: Jun. 11, 2003

(65) Prior Publication Data

US 2004/0252398 A1 Dec. 16, 2004

(51) Int. Cl.⁷ .............................................. G11B 27/36
(52) U.S. Cl. ............................. 360/31; 360/66; 360/53; 360/46
(58) Field of Search ............................... 360/66, 53, 31, 360/46, 67; 324/210, 212

(56) References Cited

U.S. PATENT DOCUMENTS

| | | | |
|---|---|---|---|
| 5,412,518 A | 5/1995 | Christner et al. | |
| 5,790,334 A | 8/1998 | Cunningham | |
| 5,978,163 A | 11/1999 | Cunningham | |
| 6,100,829 A | 8/2000 | Fredrickson et al. | |
| 6,104,563 A | 8/2000 | Dovek et al. | |
| 6,115,201 A | 9/2000 | Enarson et al. | |
| 6,144,951 A | 11/2000 | Dittmar et al. | |
| 6,172,832 B1 | 1/2001 | Dovek et al. | |
| 6,252,731 B1 | 6/2001 | Sloan et al. | |
| 6,268,974 B1 | 7/2001 | Sloan et al. | |
| 6,275,346 B1 | 8/2001 | Kim et al. | |
| 6,307,699 B1 * | 10/2001 | Patti et al. | 360/66 |
| 6,456,213 B1 | 9/2002 | Seng et al. | |
| 6,512,647 B1 | 1/2003 | Quak et al. | |
| 6,519,106 B1 | 2/2003 | Goh et al. | |

* cited by examiner

Primary Examiner—Alan T. Faber
(74) Attorney, Agent, or Firm—Kirk A Cesari

(57) ABSTRACT

A method of tuning a bias parameter for a magnetoresistive head in a data storage system includes the step of identifying, from multiple possible bias parameter values, a smallest bias parameter value for the magnetoresistive head which both maintains a bit error rate above a predetermined threshold bit error rate, and which satisfies a second criteria. The method then includes the step of setting an operational bias parameter value for the magnetoresistive head to the identified smallest bias parameter value. Also disclosed are data storage systems, or controllers which are connectable to or included with data storage systems, configured to implement the methods.

23 Claims, 6 Drawing Sheets

METHOD AND APPARATUS FOR TUNING A MAGNETORESISTIVE BIAS PARAMETER IN A DATA STORAGE SYSTEM

FIELD OF THE INVENTION

The present invention relates generally to data storage systems, and more particularly but not by limitation to methods and apparatus for tuning a bias voltage or a bias current for a magnetoresistive head.

BACKGROUND OF THE INVENTION

Magnetoresistive (MR) heads are employed in magnetic data storage systems, such as magnetic disc drives, to read data from the storage media. More particularly, the MR head employs an MR element whose resistance changes with changes in the confronting magnetic field. As the disc rotates adjacent the MR head, changing magnetic fields due to recorded data on the disc moving past the MR element induce changes in the resistance of the MR element. A fixed bias voltage is applied to the MR element to generate a current across the MR element representative of the data. The voltage changes with the resistance to provide signals representing the data.

Often, the bias voltage is chosen to be a maximum allowable for the particular MR head design, or for other supporting components. Using a maximum bias voltage increases the signal swing in the resulting sensed current in the presence of changing magnetic fields. However, using a maximum bias voltage with the MR head stresses the head and potentially decreases the head's life span and/or increases potential head instability issues at reliability stages.

Embodiments of the present invention offer advantages which can be useful in data storage systems which provide a bias current or voltage to an MR head.

SUMMARY OF THE INVENTION

A method of tuning a bias parameter for a magnetoresistive head in a data storage system includes the step of identifying, from multiple possible bias parameter values, a smallest bias parameter value for the magnetoresistive head which both maintains a bit error rate above a predetermined threshold bit error rate, and which satisfies a second criteria. The method then includes the step of setting an operational bias parameter value for the magnetoresistive head to the identified smallest bias parameter value.

In some embodiments, the step of identifying the smallest bias parameter value for the magnetoresistive head comprises identifying the smallest bias voltage for the magnetoresistive head. In other embodiments, the step of identifying the smallest bias parameter value for the magnetoresistive head comprises identifying the smallest bias current for the magnetoresistive head.

In some embodiments, the second criteria is related to track average amplitude. In more specific embodiments, the second criteria is related to a variable gain amplifier value. Variable gain amplifier values are inversely proportional to track average amplitude. In some of these more specific embodiments, the step of identifying the smallest bias parameter value for the magnetoresistive head further comprises identifying the smallest bias parameter value for the magnetoresistive head which both maintains the bit error rate above the predetermined threshold bit error rate, and which maintains the variable gain amplifier value below a predetermined variable gain amplifier threshold.

Also disclosed are data storage systems, or controllers which are connectable to or included with data storage systems, configured to implement the methods.

Other features and benefits that characterize embodiments of the present invention will be apparent upon reading the following detailed description and review of the associated drawings.

DETAILED DESCRIPTION OF ILLUSTRATIVE EMBODIMENTS

The present invention includes methods and apparatus to reduce stress on the magnetoresistive (MR) heads of data storage systems, such as disc drives. Stress is reduced, on MR heads of those data storage systems that have sufficient bit error rate (BER) and track average amplitude (TAA) margin, in order to prolong the head life span and to reduce the potential head instability issues at reliability stages of the disc drive.

Figure 1:
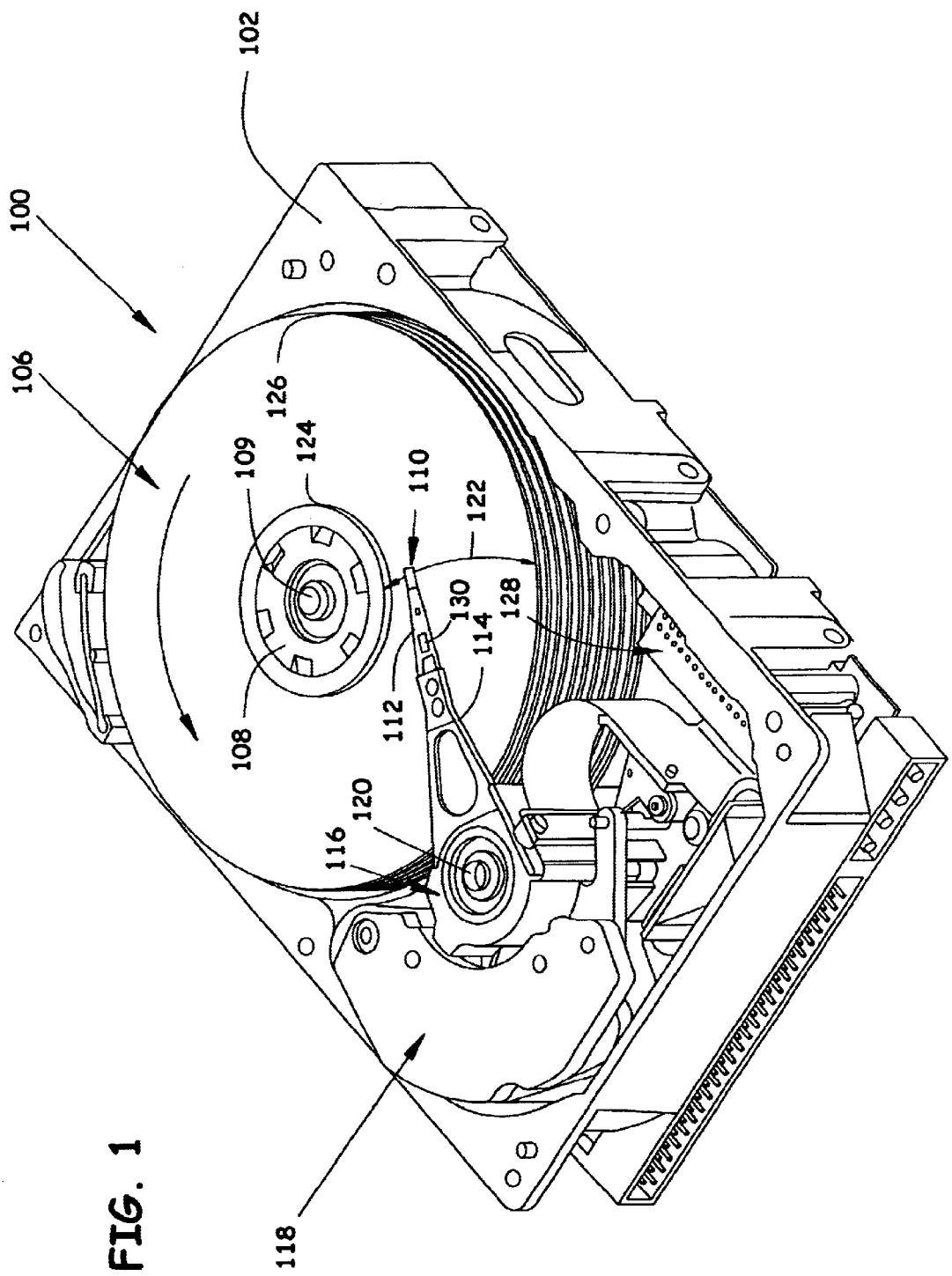
FIG. 1 is an isometric view of a disc drive type data storage system.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109.

Each disc surface has an associated disc head slider 110 which is mounted to disc drive 100 for communication with the disc surface. Sliders 110 support MR heads (represented in FIG. 2) for reading data from the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics (diagrammatically included within electronics 128) based on signals generated by heads 110 and a host computer (not shown). A micro-actuator 130, which provides fine position control of heads 110, is used in combination with VCM 118 that provides relatively coarse positioning of heads 110.

While disc drive 100 is shown in FIG. 1 for illustrative purposes, the present invention is not limited to use with disc drive data storage systems. Instead, the present invention applies to data storage systems which utilize a MR head which is biased at a particular operational bias voltage or bias current.

Normally, in disc drives, the BER performance will improve with increases in MR bias voltage applied to the MR element. Often, all disc drives of a particular type or model use a single default MR bias voltage, which is the maximum specified for the particular MR head design or for related amplifiers or other components. For example, MR bias voltages for each of multiple settings can usually be found from the specification for the preamplifier. It is common to select the maximum of the possible MR bias voltages specified in order to maximize BER performance.

Since the maximum bias voltage has been typically selected, the drive's MR heads are often stressed to the maximum extent allowed for their particular design. As a result, reliability issues associated with head instability can arise due to the high stress placed on the MR heads.

The methods of the present invention are used to tune the bias voltage to reduce these reliability, without degrading other performance aspects of the drive beyond acceptable levels. The bias voltage is sometimes referred to as VMR or $mr_i$, where is i is equal to one of N possible bias voltage values ($1 \leq i \leq N$). The invention is based therefore in part upon the recognition that the bias voltage for some drives having sufficient BER and TAA margin (relative to thresholds) can be lowered, while still maintaining satisfactory performance from the perspective of customers.

In accordance with some embodiments of the invention, the tuning is based on both BER and variable gain amplifier (VGA) values. Using a double criteria in this manner is useful for identifying drives that are good by a large margin with respect to BER performance, but which have a relatively low TAA margin, or vice versa. If one were to reduce the bias voltage for these drives, the BER margin may be lost since they are sensitive to the signal amplitude, as evidenced by the low TAA margin. As is well known, the VGA value is a good indicator for predicting TAA. More specifically, it is known that an inversely proportional relationship exists between VGA values and TAA. By measuring the VGA value for a test track on the storage media, a rough estimate of the drive TAA can be made. Thus, measuring the VGA value, an informed decision regarding drive TAA can be made. Consequently, a decision can then be made as to whether to reduce the MR bias voltage.

A description of a tuning algorithm implementation is provided both in terms of the specific case of tuning a MR bias voltage, and in terms of the more general case of tuning a MR bias parameter (voltage or current). First, however, a description of a portion of a data storage system showing components of the read channel, such as the VGA, as well as control circuitry which can be used to implement the bias parameter tuning methods of the present invention, is provided below with reference to FIG. 2.

Figure 2:
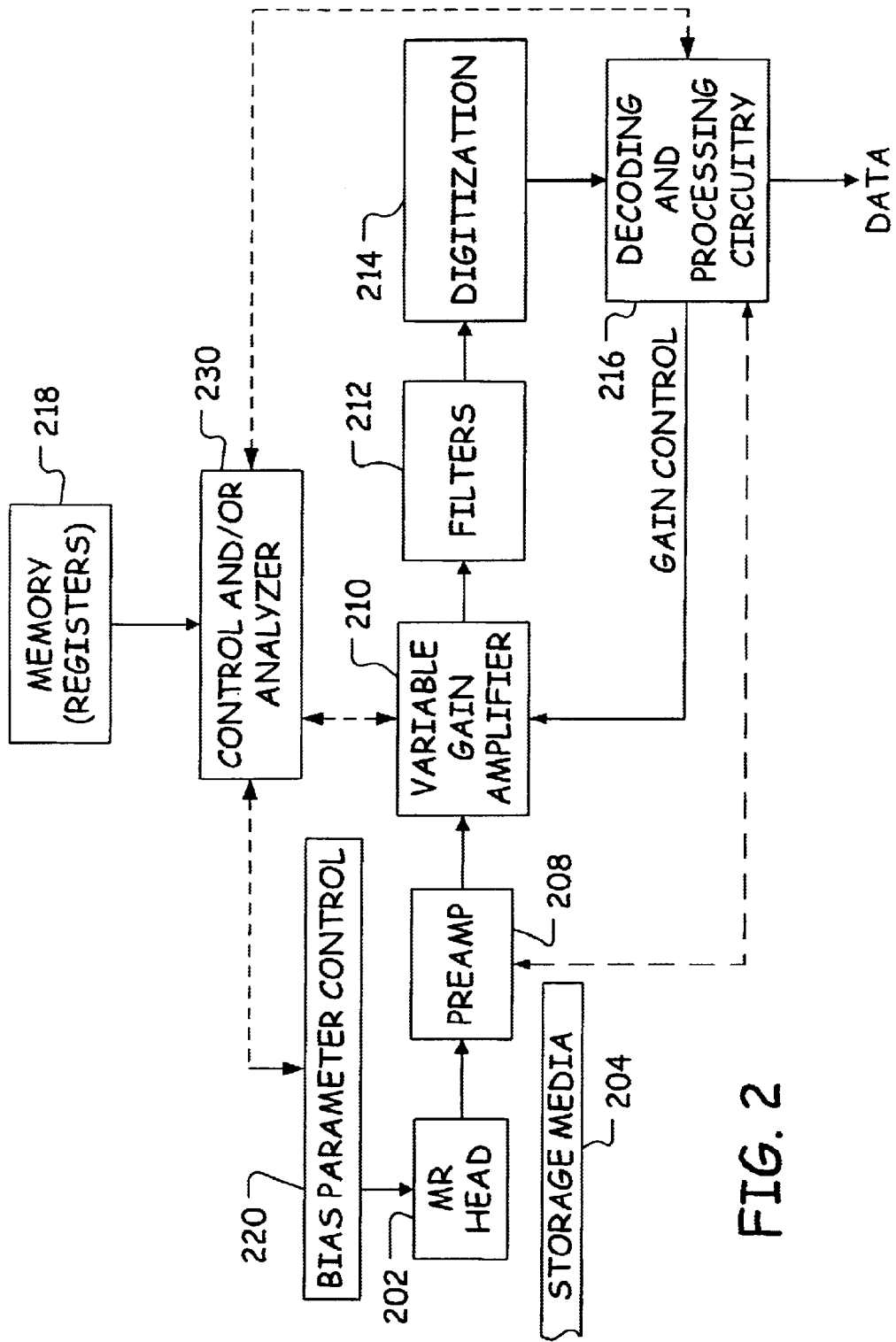
FIG. 2 is a block diagram illustrating portions of a data storage system, including components of a read channel and bias parameter generating circuits, and a controller connectable to (or included with) the data storage system.

FIG. 2 is a block diagram illustrating portions of a data storage system, such as data storage system 100, in greater detail. As such, the data storage system includes a MR head 202 of the type which can be included with head slider 110 shown in FIG. 1. MR head is shown positioned proximate a surface of storage media 204, which can for example be a data storage disc as shown in FIG. 1. A bias parameter control circuit 220 biases the MR element of the head by providing an operational bias parameter (voltage or current) to the MR head. A read channel 206 is coupled to the MR head for purposes of processing readback signals provided by the MR head. Although read channel 206 can include more or fewer components from those shown, in one embodiment read channel 206 includes a preamplifier 208, a variable gain amplifier (VGA) 210, filters 212, digitization circuitry 214 and decoding and processing circuitry 216.

Preamplifier 208 amplifies the readback signal provided by the MR head 202. Another functional block of the input stage of the read channel is the VGA 210. Together with filters 212, for example a Continuous Time Low Pass filter (CTF) and a Finite Impulse Response (FIR) filter, VGA 210 forms part of a digital Automatic Gain Control (AGC) loop. In one example, VGA 210 provides 0–24 dB of gain, programmable in 0.05 dB steps using a gain control signal for example from decoding and processing circuitry 216. In an exemplary embodiment, for purposes of describing the methods of the present invention, the VGA or VGA value refers to a register (VGAR[7:0] in one example) value, which reflects the gain provided by the VGA block 210. In this embodiment, the VGA value can be obtained by reading the register content. For illustrative purposes, memory 218 containing registers such as VGAR[7:0] is also included in the data storage system.

As discussed above, TAA is one parameter which reflects the strength of the output signal from the preamplifier. If desired, it can be measured by a disc drive analyzer (DDA) from test pins on the printed circuit board on which channel 206 is positioned. However, in some embodiments of the present invention, the VGA value is more easily read from the memory register, and thus the VGA value is used in place of the TAA.

Digitization circuitry 214 can include digital-to-analog conversion circuits, as well as other circuitry used to convert the readback signal into a digital stream of data. Decoding and processing circuitry 216 implements various decoding functions on the digitized data, for example Error Correcting Codes (ECC) and/or other known decoding steps. For illustrative purposes, the decoding and processing circuitry 216 is also described as implementing various other processing tasks of channel 206. For example, this processing circuitry can calculate the BER or other parameters, and provide that information upon request.

Controller and/or analyzer 230 can be coupled to memory registers 218, decoding and processing circuitry 216, VGA 210 and bias parameter control 220, though it need not be coupled directly to all of these components. Controller and/or analyzer (hereafter controller) 230 represents the circuitry where the methods of the present invention are implemented. As such, controller 230 can be a controller which is coupleable to a disc drive (for example via a test fixture) for purposes of tuning the MR bias parameter. In the alternative, controller 230 can be included in the disc drive, for example being implemented in circuitry 216 instead. Once controller 230 determines which bias parameter value to use, the bias parameter is provided to bias parameter control circuitry 220 for biasing the MR head during operation. A discussion of methods which are implemented in controller 230 is now provided.

Figure 3:
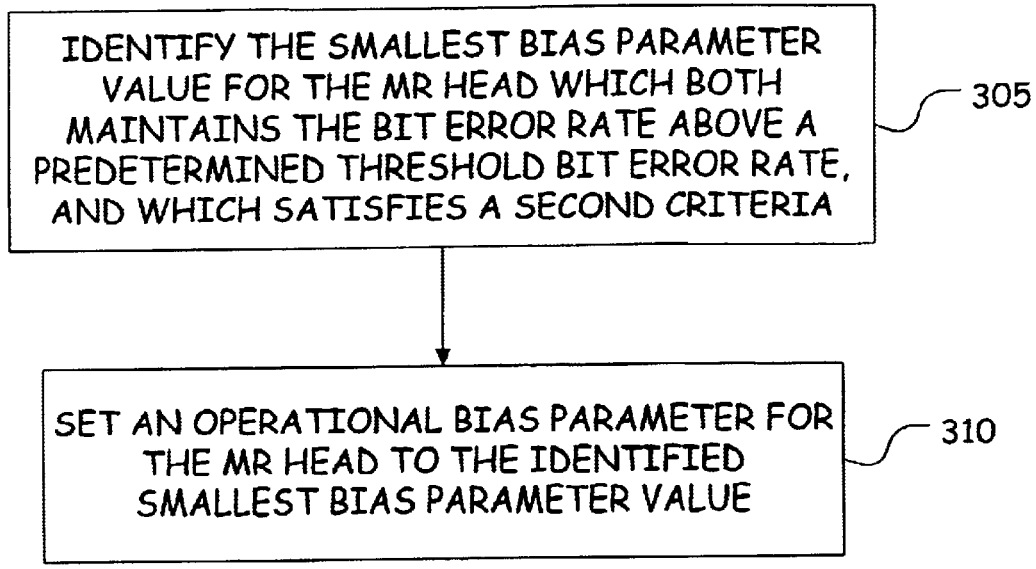
FIG. 3 is a block diagram illustrating a general method in accordance with an embodiment of the present invention.

FIG. 3 illustrates a general method of the present invention of tuning a bias parameter of an MR head in a data storage system. The method begins with the step shown in block 305 of identifying the smallest bias parameter value for the MR head which both maintains the BER above a predetermined threshold BER, and which satisfies a second criteria. As discussed above, the bias parameter can be bias voltage or bias current, and the bias parameter value is typically selected from a number of possible bias parameter values. Also, the second criteria can be, for example, maintaining the TAA above a predetermined TAA threshold or maintaining the VGA value below a predetermined VGA threshold. As illustrated at block 310, the method then includes setting an operational bias parameter value for the MR head to the identified smallest bias parameter value.

Generally, for every product, a pre-defined minimum BER that should be achieved by all passing drives is established. The BER threshold is equal to this minimum BER plus a delta BER. This positive delta BER is the BER margin. For example, a minimum BER of 5.0 and a delta BER of 2.5 results in a threshold BER of 7.5 If a drive cannot maintain the threshold BER during certification testing, that drive is failed. Also, moderate VGA values are determined, usually with the desire to not drive the VGA to its two extremes (too small or too large).

Choosing the BER threshold and VGA threshold typically involves compromise. First of all, it is desirable to reduce the stress on the MR head by lowering down the MR bias voltage. However, at the same time, this has a negative impact on BER, and it is undesirable to sacrifice BER so much that the yield is affected. The general relationships between the bias voltage, the BER, the TAA and the VGA value for normally operating drives is as follows:

reduce bias voltage→smaller TAA→larger VGA and poorer BER

In verifying the methods of the present invention, more than one hundred drives were evaluated for data collection purpose. A BER threshold and VGA threshold combination were selected such that about fifty percent of the drives would choose high-side MR bias voltage and the fifty percent would choose low-side MR bias voltage. After verifying the algorithm on other disc drives, it was proven to work well without causing excessive numbers of drives to fail, or without causing related reliability issues to arise.

Generally, the analysis of which drives should have their MR bias voltage lowered can be summarized as follows:
1. Good BER, large VGA (small TAA)→should not reduce bias voltage as BER is sensitive to TAA;
2. Good BER, small VGA (large TAA)→should reduce bias voltage, as it is affordable to reduce head stress;
3. Poor BER, small VGA (large TAA)→should not reduce bias voltage, as it could result in lowered yields;
4. Poor BER, small VGA (small TAA)→definitely should not reduce bias voltage, as these drives are marginal, and doing so may result in potential reliability problems.

Figure 4:
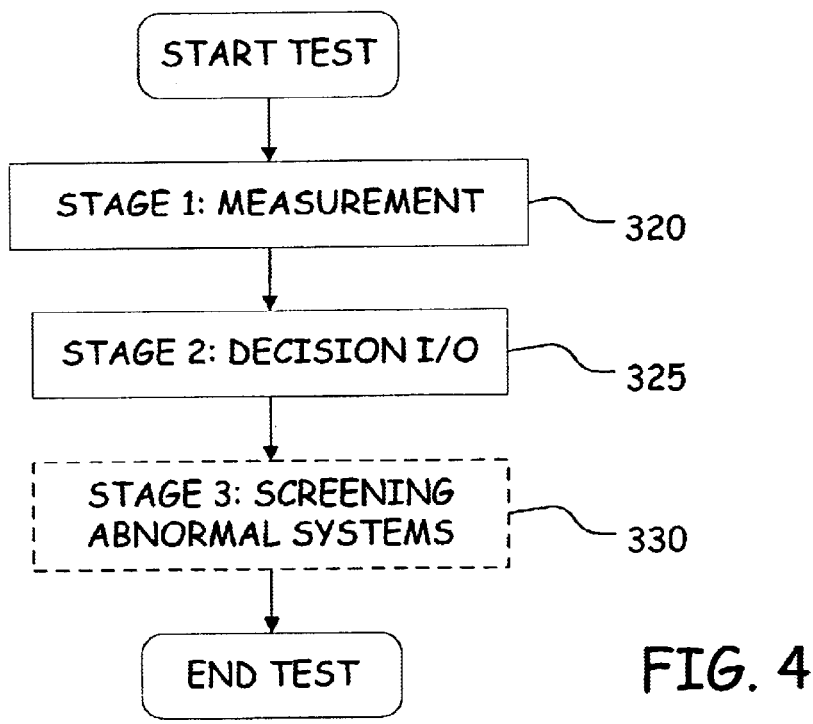
FIG. 4 is a block diagram illustrating method steps used to implement the method shown in FIG. 3 in one embodiment.

FIG. 4 is a block diagram which illustrates methods steps which can be used to implement method step 305 shown in FIG. 3. These method steps constitute a testing procedure which can be categorized as having stage 1 measurement steps and stage 2 decision steps, which are represented in FIG. 3 at blocks 320 and 325, respectively. As will be described, in some embodiments, if only MR bias voltage tuning is concerned, stage 1 steps 320 and stage 2 steps 325 can be combined. The stage 1 steps can also be used to prepare for optional stage 3 screening steps represented at block 330, which will also be described in greater detail in the following discussions.

In an example, the log BER threshold is selected to be a constant, $BER_{Threshold}$, and the VGA threshold is set to be another constant, $VGA_{Threshold}$. These values can be selected for particular models of drives based on empirically collected data. Since BER can be defined in several different ways, it is important to note that herein the definition of BER is the number of bits processed before an erroneous bit is found, or an equivalent definition. Thus, it is desirable to have the actual BER be higher than the $BER_{Threshold}$. Using another common definition in which the BER is the ratio of the number of erroneous bits divided by the total number of bits transmitted, received, or processed over some stipulated period of time, it would be desirable to have the actual BER be lower than the $BER_{Threshold}$, and the algorithm would have to be modified accordingly.

Figure 5:
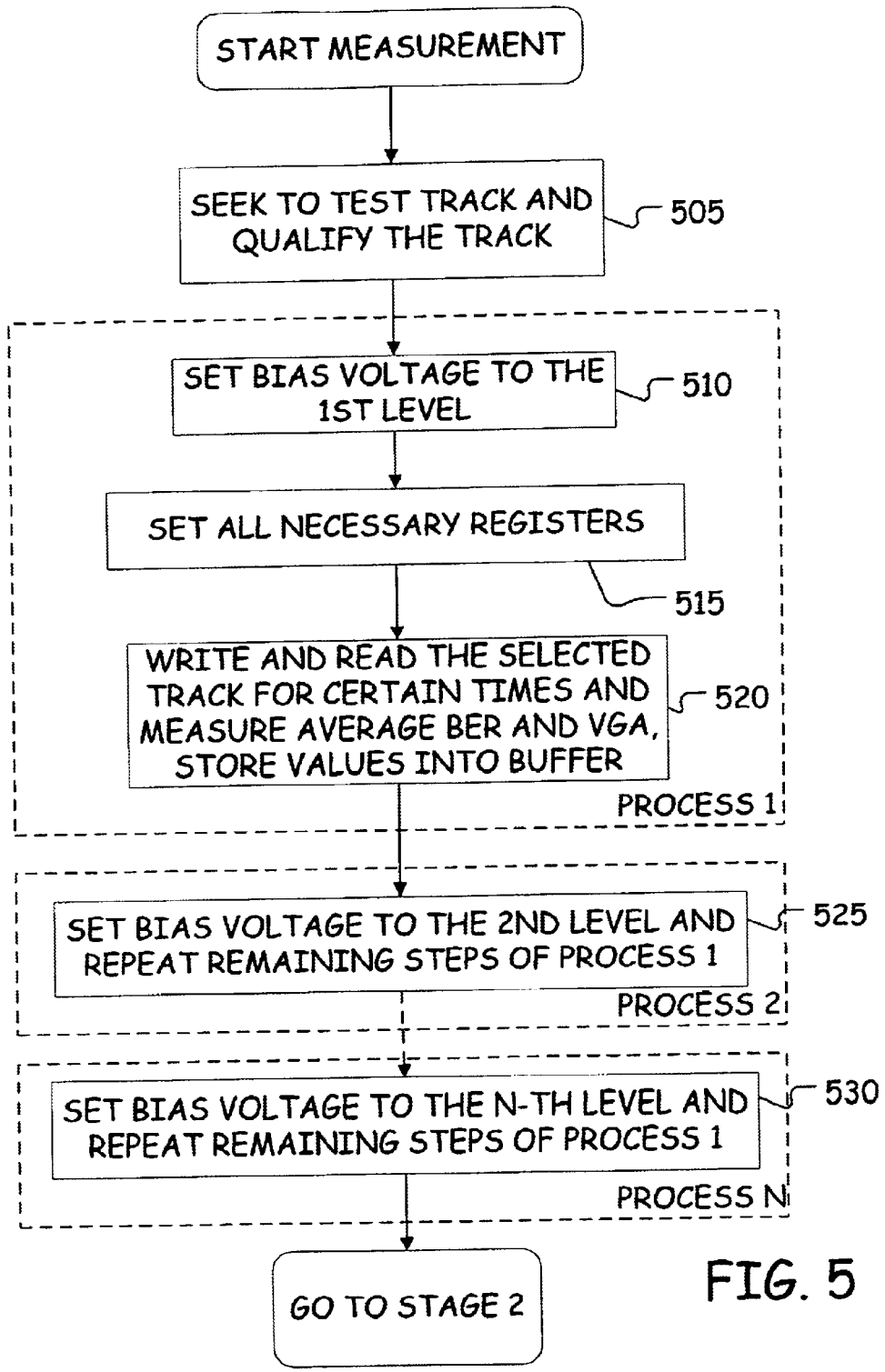
FIG. 5 is a block diagram illustrating method steps used to implement the method shown in FIG. 3 in one embodiment.
Figure 6:
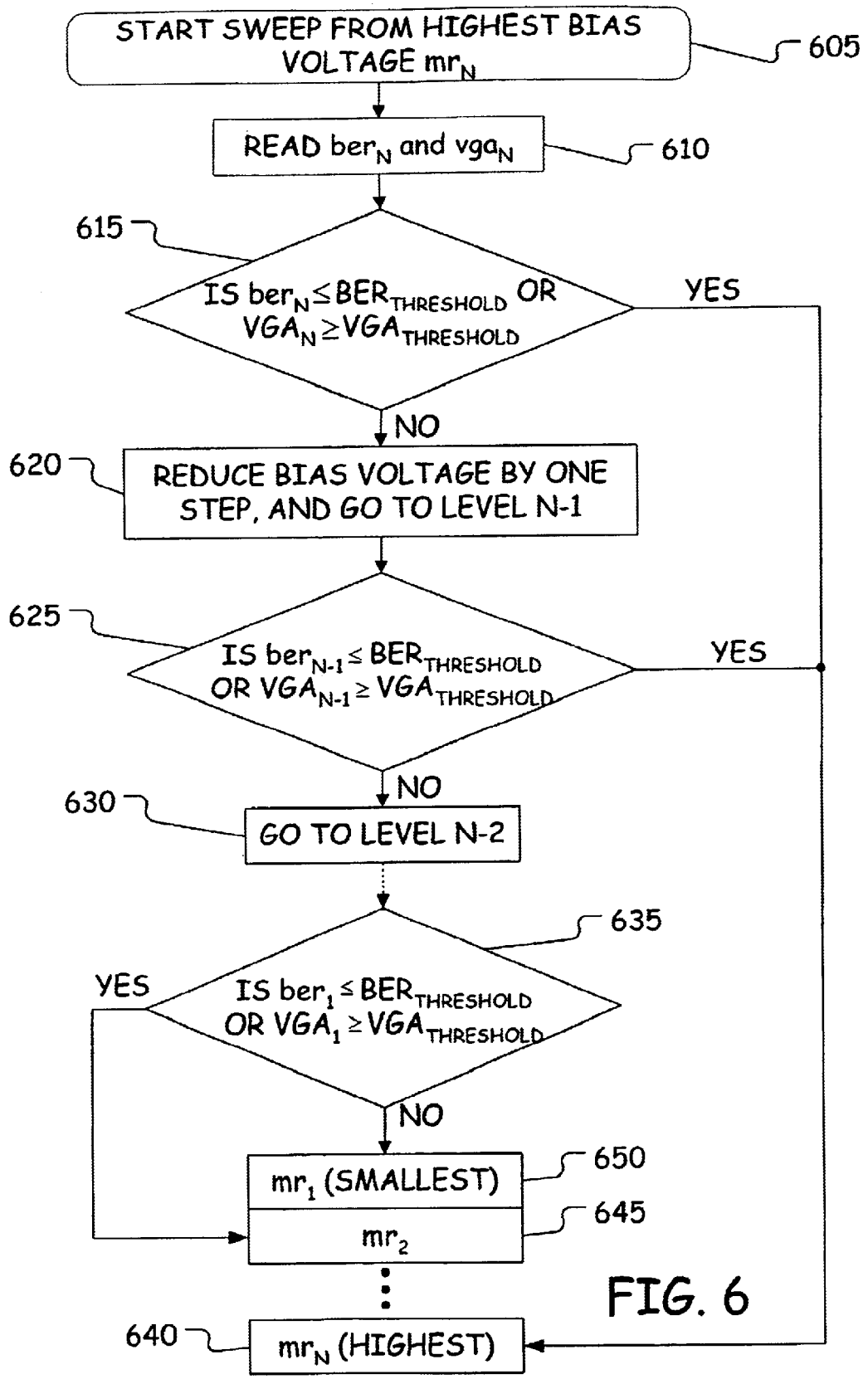
FIG. 6 is a block diagram illustrating method steps used to implement the method shown in FIG. 3 in one embodiment.

FIGS. 5 and 6 respectively illustrate in greater detail the stage 1 measurement steps and the stage 2 decision steps. In the discussions of these FIGS., the following definitions are used:
- $mr_1$ through $mr_N$ are the smallest through the largest bias voltage (or parameter) values;
- N is the number of steps or bias voltages (or parameters) available;
- $ber_1$ through $ber_N$ are the respective BERs with the bias voltages (or parameters) set to $mr_1$ through $mr_N$; and
- $vga_1$ through $vga_N$ are the respective VGA values with the bias voltages (or parameters) set to $mr_1$ through $mr_N$.

Using the method steps shown in FIG. 5, the BER and VGA values ($ber_1$ through $ber_N$ and $vga_1$ through $vga_N$) are measured with the MR head operating over a test track on the media surface. These measurement steps can be as follows. As illustrated at block 505, the measurement steps of stage 1 begin by seeking the MR head to a test track and qualifying the track. In an example embodiment, the test track is the outer diameter track on a data storage disc, though this need not be the case. Also, in one embodiment, qualifying the track can include determining that the positioning error signal (PES) is good, and then verifying that no hard media defects exist. It is also possible to have pre-qualified the track if desired.

Next, a series of N processes for obtaining the BER and VGA data are performed. First, as shown in the dashed block entitled "Process 1", the bias voltage is set to the first or lowest level ($mr_1$). Then, as shown at block 515, all necessary registers are set. For certification testing, various registers (for example those stored in memory 218 shown in FIG. 2) must have their current values stored into a buffer before the registers can be set to the desired values for the particular test. After the test is complete, the registers are restored to their original values from the buffer.

With the bias voltage set to the first or lowest level ($mr_1$), the selected test track is written to and read from for predetermined periods of time. During this process, the average BER (i.e., $ber_1$) and the average VGA value (i.e., $vga_1$) are measured and also stored in the buffer. This is illustrated at block 520.

Next, as illustrated in the dashed block entitled "Process 2", the bias voltage is increased to the second or next highest level ($mr_2$) as shown at block 525, and the remaining steps of Process 1 (i.e., steps 515 and 520) are repeated. Thus, the average BER (i.e., $ber_2$) and the average VGA value (i.e., $vga_2$) are measured and also stored in the buffer. As shown in the dashed block entitled "Process N" and in block 530 included within Process N, the process is repeated for all N values of bias voltage, with the result being N sets of the average BER (i.e., $ber_i$) and the average VGA value (i.e., $vga_i$) having been measured and also stored in the buffer. At the conclusion of Process N, the method continues to the stage 2 decision steps shown in FIG. 6.

As shown in FIG. 6, a series of comparisons of the N sets of the average BER (i.e., $ber_i$) and the average VGA value (i.e., vga$_i$) are made relative to threshold values BER$_{Threshold}$ VGA$_{Threshold}$. In order to minimize the number of processing steps required to make the decision whether to lower the bias voltage from its highest value, the comparisons begin with the BER and VGA values ber$_N$ and vga$_N$ obtained with the bias voltage at its highest setting mr$_N$. This is illustrated in blocks 605 and 610, which result in these BER and VGA values being read from the buffer of memory 218 shown in FIG. 2. At step 615, a determination is made as to whether:

$$ber_N \leq BER_{Threshold} \text{ or } vga_N \geq VGA_{Threshold}$$

If either of those conditions exist, the determination is made that the bias voltage cannot be lowered from its maximum value, and the process can stop. This is illustrated at block 640.

If neither of the conditions exist, at step 620 the referenced bias voltage is reduced by one step (i.e., to mr$_{N-1}$). This means that the corresponding BER and VGA values, ber$_{N-1}$ and vga$_{N-1}$, are retrieved from the buffer for the next set of comparisons to the thresholds. These comparisons are shown at step 625. Again, if either of these conditions exist, the determination is made that the bias voltage cannot be lowered from its maximum value, and the process can stop at block 640.

If once again neither of these two conditions exist, at step 630 the referenced bias voltage is reduced by an additional step (i.e., to mr$_{N-2}$). This means that the corresponding BER and VGA values, ber$_{N-2}$ and vga$_{N-2}$, are retrieved from the buffer for the next set of comparisons to the thresholds. These comparisons are illustrated in FIG. 6 by the dashed line 632 representing the fact that the comparisons continue in the same manner up until the comparisons shown at block 635 for the smallest BER and VGA values, ber$_1$ and vga$_1$.

Beginning with the BER and VGA values, ber$_{N-2}$ and vga$_{N-2}$, if it is determined that either of the two threshold conditions is met (i.e., ber$_i$ falls below BER$_{Threshold}$ or vga$_i$ is above VGA$_{Threshold}$), then the test fails and the bias voltage level selected is i+1. For example, if ber$_1 \leq$ BER$_{Threshold}$ or if vga$_1 \geq$ VGA$_{Threshold}$, then mr$_2$ is the identified at block 645 as the smallest bias voltage which can be used. If neither of the conditions ber$_1 \leq$ BER$_{Threshold}$ or if vga$_1 \geq$ VGA$_{Threshold}$ is true, then the bias voltage can be set to the lowest possible value mri as shown at block 650.

As described briefly above, if only the bias voltages are being tuned, then stages 1 and 2 shown in steps 320 and 325 of FIG. 4 can be combined if desired. In general, not all of the stage 1 measurements are required for the stage 2 process since stage 2 is implemented in a reverse order. In the stage 1 process, all of the BER and VGA values can be collected for all possible MR bias voltages. In the stage 2 process, the BER and VGA values, ber$_i$ and vga$_i$, are swept through, from highest MR bias voltage to lowest MR bias voltage. The process can stop as soon as either of the two threshold conditions is met (i.e., ber$_i$ falls below BER$_{Threshold}$ or vga$_i$ is above VGA$_{Threshold}$).

The rational for the stage 1 process is, in accordance with a first aspect of the invention, to screen out "abnormal" drives which fail the above criteria. For "normal" drives, the relation ship described above holds true, namely:

reduce bias voltage→smaller TAA→larger VGA and poorer BER

However, some drives have been found with head-related problems that cause the drive to exhibit the opposite behavior. In other words, for these drives, the following relationship holds true:

reduce bias voltage→better BER

In accordance with an additional aspect of the invention, the methods or algorithms disclosed herein can be used to screen out these drives at the certification stage as well. Additionally, doing so justifies the time taken to collect all BER and VGA values for all possible MR bias voltages during the stage 1 process, even if all of these values aren't used in the stage 2 process. This additional screening is depicted in the optional stage 3 process 330 shown in FIG. 4.

Figure 7:
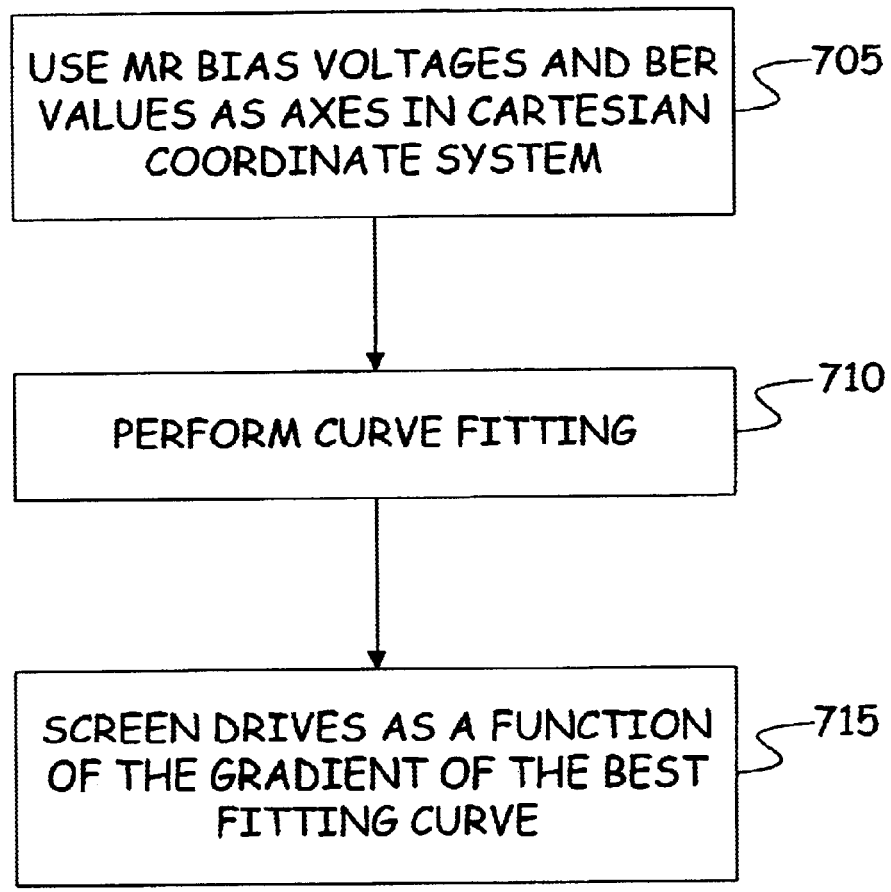
FIG. 7 is a block diagram illustrating method steps used to implement the method shown in FIG. 3 in one embodiment.

In accordance with some embodiments of the present invention, the stage 3 screening process 330 can be as described below and as illustrated in the flow diagram of FIG. 7. As shown at block 705 in FIG. 7, the MR bias voltages and the BER values are used as the x and y axes of a Cartesian coordinate system. For example, the MR bias voltages can be used as the x-axis in a Cartesian coordinate system, and the BER values can be used as the y-axis.

Next, as illustrated at block 710, curve fitting is performed between the BER values as a function of the MR bias voltage. For example, the curve fitting can be first order curve fitting to find the best fitting curve y=kx+c in an MMS (minimum mean square) sense, where k is the gradient, c is a constant, y is the BER value, and x is the MR bias voltage value. All of the MR bias voltages and BER values collected in stage 1 will then be used.

Next, as illustrated at block 715, drives are screened as a function of the gradient k identified in the curve fitting step in which the first order polynomial is determined. For example, in one embodiment, if k is a positive number, then the drive can be considered "normal" because it implies or follows the relationship of increased bias voltage resulting in improved BER, and the testing can be continued or completed. If k is a negative number, the drive can be failed and the certification test is exited. In an alternative embodiment, the drive can be considered normal if k is negative but has an absolute value close to zero. In these embodiments, the drive can be failed if the negative value of k is less than a negative threshold G$_{threshold}$.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive, while maintaining substantially the same functionality without departing from the scope and spirit of the present invention. Further, while specific examples have been describe with reference to tuning a bias voltage, these methods can be adapted to tune other bias parameters such as bias current as well.

What is claimed is:

1. A method of tuning a bias parameter for a magnetoresistive head in a data storage system, the method comprising:

identifying from a plurality of bias parameter values a smallest bias parameter value for the magnetoresistive head which both maintains a bit error rate above a predetermined threshold bit error rate, and which satisfies a second criteria; and setting an operational bias parameter value for the magnetoresistive head to the identified smallest bias parameter value.

2. The method of claim 1, wherein identifying from the plurality of bias parameter values the smallest bias parameter value for the magnetoresistive head comprises:
identifying from a plurality of bias voltages a smallest bias voltage for the magnetoresistive head.

3. The method of claim 1, wherein identifying from the plurality of bias parameter values the smallest bias parameter value for the magnetoresistive head comprises:
identifying from a plurality of bias currents a smallest bias current for the magnetoresistive head.

4. The method of claim 1, wherein the second criteria is related to track average amplitude.

5. The method of claim 4, wherein identifying from the plurality of bias parameter values the smallest bias parameter value for the magnetoresistive head which both maintains the bit error rate above the predetermined threshold bit error rate, and which satisfies the second criteria further comprises:
identifying from the plurality of bias parameter values the smallest bias parameter value for the magnetoresistive head which both maintains the bit error rate above the predetermined threshold bit error rate, and which maintains the track average amplitude above a predetermined track average amplitude threshold.

6. The method of claim 1, wherein the second criteria is related to a variable gain amplifier value.

7. The method of claim 6, wherein identifying from the plurality of bias parameter values the smallest bias parameter value for the magnetoresistive head which both maintains the bit error rate above the predetermined threshold bit error rate, and which satisfies a second criteria further comprises:
identifying from the plurality of bias parameter values the smallest bias parameter value for the magnetoresistive head which both maintains the bit error rate above the predetermined threshold bit error rate, and which maintains the variable gain amplifier value below a predetermined variable gain amplifier threshold.

8. The method of claim 7, wherein identifying from the plurality of bias parameter values the smallest bias parameter value for the magnetoresistive head which both maintains the bit error rate above the predetermined threshold bit error rate, and which maintains the variable gain amplifier value below the predetermined variable gain amplifier threshold, further comprises:
for each particular bias parameter value of the plurality of bias parameter values:
setting the operational bias parameter value for the magnetoresistive head temporarily to the particular bias parameter value; and
writing and reading on a test track of a data storage media with the operational bias parameter value set to the particular bias parameter value;
while writing and reading on the test track using the particular bias parameter value, measuring an average bit error rate and an average variable gain amplifier value; and
storing the measured average bit error rate and the average variable gain amplifier value measured using the particular bias parameter value.

9. The method of claim 8, and further comprising:
identifying, from the measured average bit error rate and average variable gain amplifier value stored for each particular bias parameter value, which of the plurality of bias parameter values both maintain the bit error rate above the predetermined threshold bit error rate and maintain the variable gain amplifier value below the predetermined variable gain amplifier value; and
selecting the smallest bias parameter value for the magnetoresistive head which both maintain the bit error rate above the predetermined threshold bit error rate and maintain the variable gain amplifier value below the predetermined variable gain amplifier value.

10. The method of claim 1, and further comprising:
obtaining a plurality of bit error rate values corresponding to a plurality of bias voltage values for the magnetoresistive head;
curve fitting the plurality of bit error rates for the magnetoresistive head as a function of the plurality of bias voltage values to obtain a curve gradient; and
screening the data storage system as a function of the obtained curve gradient.

11. A controller which is connectable to a data storage system, the controller configured to tune a bias parameter of a magnetoresistive head in the data storage system by implementing method steps comprising:
identifying from a plurality of bias parameter values a smallest bias parameter value for the magnetoresistive head which both maintains a bit error rate above a predetermined threshold bit error rate, and which satisfies a second criteria; and
setting an operational bias parameter value for the magnetoresistive head to the identified smallest bias parameter value.

12. The controller of claim 11, wherein the step of identifying from the plurality of bias parameter values the smallest bias parameter value for the magnetoresistive head further comprises:
identifying from a plurality of bias voltages a smallest bias voltage for the magnetoresistive head.

13. The controller of claim 11, wherein the step of identifying from the plurality of bias parameter values the smallest bias parameter value for the magnetoresistive head further comprises:
identifying from a plurality of bias currents a smallest bias current for the magnetoresistive head.

14. The controller of claim 11, wherein the second criteria is related to track average amplitude.

15. The controller of claim 14, wherein the step of identifying from the plurality of bias parameter values the smallest bias parameter value for the magnetoresistive head which both maintains the bit error rate above the predetermined threshold bit error rate, and which satisfies the second criteria further comprises:
identifying from the plurality of bias parameter values the smallest bias parameter value for the magnetoresistive head which both maintains the bit error rate above the predetermined threshold bit error rate, and which maintains the track average amplitude above a predetermined track average amplitude threshold.

16. The controller of claim 11, wherein the second criteria is related to a variable gain amplifier value.

17. The controller of claim 16, wherein the step of identifying from the plurality of bias parameter values the smallest bias parameter value for the magnetoresistive head which both maintains the bit error rate above the predetermined threshold bit error rate, and which satisfies a second criteria further comprises:
identifying from the plurality of bias parameter values the smallest bias parameter value for the magnetoresistive head which both maintains the bit error rate above the predetermined threshold bit error rate, and which maintains the variable gain amplifier value below a predetermined variable gain amplifier threshold.

18. The controller of claim 17, wherein the step of identifying from the plurality of bias parameter values the smallest bias parameter value for the magnetoresistive head which both maintains the bit error rate above the predetermined threshold bit error rate, and which maintains the variable gain amplifier value below the predetermined variable gain amplifier threshold, further comprises:

for each particular bias parameter value of the plurality of bias parameter values:
setting the operational bias parameter value for the magnetoresistive head temporarily to the particular bias parameter value; and
writing and reading on a test track of a data storage media with the operational bias parameter value set to the particular bias parameter value;
while writing and reading on the test track using the particular bias parameter value, measuring an average bit error rate and an average variable gain amplifier value; and
storing the measured average bit error rate and the average variable gain amplifier value measured using the particular bias parameter value.

19. The controller of claim 18, wherein the step of identifying from the plurality of bias parameter values the smallest bias parameter value for the magnetoresistive head which both maintains the bit error rate above the predetermined threshold bit error rate, and which maintains the variable gain amplifier value below the predetermined variable gain amplifier threshold, further comprises:

identifying, from the measured average bit error rate and average variable gain amplifier value stored for each particular bias parameter value, which of the plurality of bias parameter values both maintain the bit error rate above the predetermined threshold bit error rate and maintain the variable gain amplifier value below the predetermined variable gain amplifier value; and selecting the smallest bias parameter value for the magnetoresistive head which both maintain the bit error rate above the predetermined threshold bit error rate and maintain the variable gain amplifier value below the predetermined variable gain amplifier value.

20. A data storage system including the controller of claim 11.

21. A controller which is connectable to a data storage system, the controller configured to tune a bias parameter of a magnetoresistive head in the data storage system, the controller comprising:

means for identifying from a plurality of bias parameter values a smallest bias parameter value for the magnetoresistive head which both maintains a bit error rate above a predetermined threshold bit error rate, and which satisfies a second criteria.

22. The controller of claim 21, wherein the means for identifying from the plurality of bias parameter values the smallest bias parameter value for the magnetoresistive head is configured to implement the step of:

identifying from a plurality of bias voltages a smallest bias voltage for the magnetoresistive head.

23. The controller of claim 21, wherein the means for identifying from the plurality of bias parameter values the smallest bias parameter value for the magnetoresistive head is configured to implement the step of:

identifying from a plurality of bias currents a smallest bias current for the magnetoresistive head.

* * * * *